United States Patent
Wang

(10) Patent No.: US 8,279,314 B2
(45) Date of Patent: Oct. 2, 2012

(54) APPARATUS AND METHOD FOR ELIMINATING ARTIFACTS IN ACTIVE PIXEL SENSOR (APS) IMAGERS

(75) Inventor: Yibing (Michelle) Wang, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 83 days.

(21) Appl. No.: 12/986,422

(22) Filed: Jan. 7, 2011

(65) Prior Publication Data

US 2011/0102645 A1    May 5, 2011

Related U.S. Application Data

(63) Continuation of application No. 12/216,033, filed on Jun. 27, 2008, now Pat. No. 8,063,965, which is a continuation of application No. 10/928,323, filed on Aug. 30, 2004, now Pat. No. 7,411,621, which is a continuation of application No. 09/522,287, filed on Mar. 9, 2000, now Pat. No. 6,803,958.

(60) Provisional application No. 60/123,488, filed on Mar. 9, 1999.

(51) Int. Cl.
*H04N 3/14* (2006.01)
*H04N 5/335* (2011.01)
*H04N 5/14* (2006.01)
*H01L 27/00* (2006.01)

(52) U.S. Cl. ............... 348/308; 348/303; 250/208.1

(58) Field of Classification Search .......... 348/308–310, 348/303, 246, 247, 294, 302
See application file for complete search history.

(56) References Cited

U.S. PATENT DOCUMENTS

| | | | |
|---|---|---|---|
| 5,327,246 A | 7/1994 | Suzuki | 348/246 |
| 5,471,515 A | 11/1995 | Fossum et al. | 377/60 |
| 5,631,704 A | 5/1997 | Dickinson et al. | |
| 5,920,274 A | 7/1999 | Gowda et al. | |
| 5,978,025 A | 11/1999 | Tomasini et al. | |
| 6,008,486 A | 12/1999 | Stam et al. | 250/208.1 |
| 6,128,039 A | 10/2000 | Chen et al. | |
| 6,166,768 A | 12/2000 | Fossum et al. | |
| 6,236,750 B1 | 5/2001 | Garber | 382/162 |
| 6,344,877 B1 | 2/2002 | Gowda et al. | |
| 6,529,238 B1 | 3/2003 | Mahant-Shetti et al. | |
| 6,765,614 B1 | 7/2004 | Matsukawa | 348/246 |
| 6,873,363 B1 | 3/2005 | Barna et al. | |

*Primary Examiner* — Sinh Tran
*Assistant Examiner* — Christopher K Peterson
(74) *Attorney, Agent, or Firm* — Dickstein Shapiro LLP

(57) ABSTRACT

An active pixel sensor (APS) that includes circuitry to eliminate artifacts in digital images. The APS includes a comparator for comparing a signal level from a pixel to an adjusted saturation voltage to determine if the pixel is saturated. If the pixel is saturated, the signal output from the pixel is replaced with an analog voltage having a maximum value corresponding to a brightest pixel in the image.

10 Claims, 4 Drawing Sheets

APPARATUS AND METHOD FOR ELIMINATING ARTIFACTS IN ACTIVE PIXEL SENSOR (APS) IMAGERS

CROSS REFERENCE TO RELATED APPLICATIONS

The present application is a continuation of U.S. application Ser. No. 12/216,033, filed on Jun. 27, 2008 now U.S. Pat. No. 8,063,965, which is a continuation of U.S. application Ser. No. 10/928,323, filed on Aug. 30, 2004 (now U.S. Pat. No. 7,411,621), which is a continuation application of U.S. application Ser. No. 09/522,287 filed on Mar. 9, 2000 (now U.S. Pat. No. 6,803,958), which claims priority to U.S. Provisional Application No. 60/123,488 filed on Mar. 9, 1999, the disclosures of all of which are hereby incorporated by reference in their entirety.

BACKGROUND

Active pixel sensor (APS) devices are described in U.S. Pat. No. 5,417,515. These devices include an array of pixel units that convert light energy into electrical signals. Each pixel includes a photodetector and one or more active transistors.

Unlike charge coupled devices (CCD), APS imaging devices are compatible with complementary metal oxide semiconductor (CMOS) technology. This feature enables integration of imaging electronics and digital image signal processing electronics on the same chip in APS devices. Such integration can provide advantages in design and performance.

Conventional CMOS imaging devices can be prone to producing artifacts in the resulting image. Artifacts are objects in the image that appear black when in fact they should be the brightest regions of the image.

Artifacts can occur in oversaturated pixels in the APS. Oversaturated pixels are pixels that are exposed to more light energy than the pixel's photodetector can absorb during exposure time.

This is mainly a problem in very high contrast images. The extreme brightness of the sun will produce artifacts in virtually all CMOS imagers, even at very short integration times. This is a disconcerting effect in outdoor imaging situations, in which the sun is often accidentally included in the field of view.

FIG. 1 illustrates such a situation in a digital image 10 produced using a conventional APS CMOS imager. The presence of the sun 12 in the image produces an artifact 14 in which the center of the sun appears black.

SUMMARY

An active pixel sensor according to an embodiment includes at least one pixel having a photodetector that outputs an output level indicative of incoming light. A storage element stores said output level during a photodetector readout operation. A comparison element compares the output level to an adjusted saturation voltage. An output selector electrically connected to the comparison element selectively outputs an adjusted maximum voltage during a pixel readout operation in response to the comparison element determining that the adjusted saturation voltage exceeds the output level.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Oversaturated pixels in an active pixel sensor (APS) can produce artifacts in the resulting images in high contrast situations. Artifacts are objects in the image that appear black, but in fact should be among the brightest objects in the image.

According to one embodiment, the value read out from an oversaturated pixel is replaced with a predetermined maximum value corresponding to a maximum brightness for the pixels in the image. This eliminates any artifacts in the resulting image. The pixels in the APS array that receive the most light appear brightest in the images that are produced.

Figure 2:
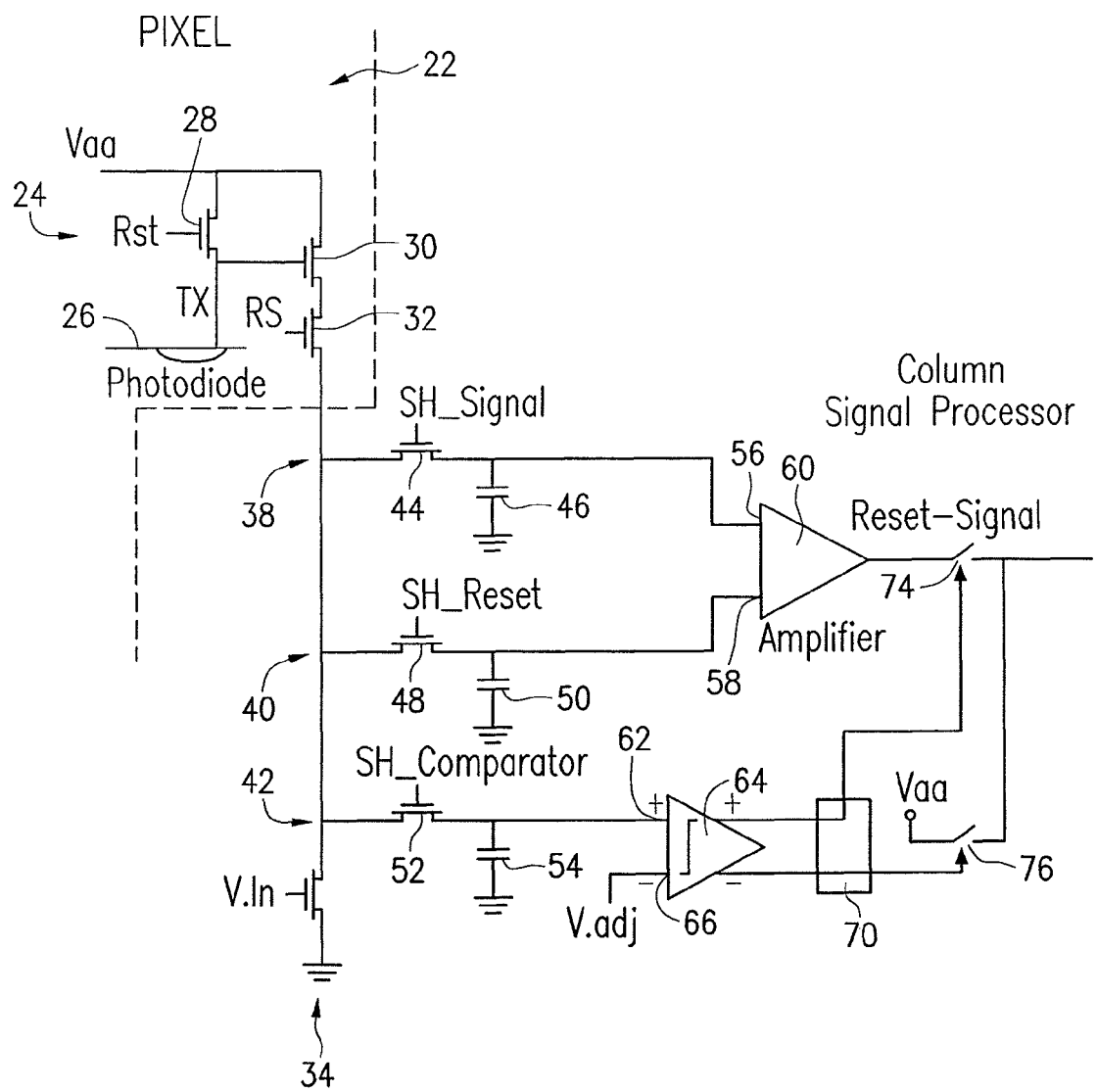
FIG. 2 is a schematic diagram according to one embodiment.

FIG. 2 illustrates an APS 20 according to an embodiment that includes an array of independently addressable pixels arranged in n rows and m columns. An independently addressable pixel 22 in a row 24 includes a voltage source set at V.aa, typically set at about 3.3 V to 5.0 V, a photodiode 26, a reset transistor 28, a source-follower output transistor 30, and a row select transistor 32. Pixels in each row are connected to a column 34. The bottom of each column of pixels has a load transistor 36 at a voltage V.ln, a signal branch 38 to sample and store the signal level for readout, a reset branch 40 to sample and store the reset level for readout, and a comparator branch 42 to sample and store the signal level for a comparison to determine whether the pixel is saturated.

Signal branch 38 has a sample and hold (SH) element. This can include a sampling switch 44 and a holding capacitor 46. Similarly, reset branch 40 includes a sampling switch 48 and a holding capacitor 50, and comparator branch 42 includes a sampling switch 52 and a holding capacitor 64.

Signal branch 38 and reset branch 40 are connected to the input nodes 56, 58, respectively, of a differential amplifier 60.

Differential amplifier 60 amplifies the difference between the reset voltage R and the signal voltage S to produce a difference voltage (R-S). This difference voltage is used to set the brightness value of the pixel. Pixels with higher difference voltages (R-S) appear brighter in the resulting image.

Comparator branch 42 is connected to an input node 62 of a comparator device 64. The other input node 66 of comparator 64 is connected to an analog voltage, V.adj, that is adjusted to set a minimum signal level corresponding to a signal voltage of a saturated pixel.

The output of comparator 64 is connected to an analog multiplexer (MUX) 70. The MUX controls a normally open switch 74 at the output of differential amplifier 60 and a normally open switch 76 at the output of a voltage source 78 set at V.aa.

These readout and comparator circuits can be common to entire column 34 of pixels.

Each photodetector 26 in each pixel 22 in the array converts light energy received in the form of photons into an electrical charge. That charge corresponds to the amount of light that pixel receives prior to a read out function. Readout of pixel 22 for row 24 occurs in three stages: an image integration stage; a signal readout stage; and a reset stage.

Prior to readout, the voltage on photodiode 26 is reset voltage R. Reset voltage R is typically about 3.0 V. After row 24 has been selected for readout, this voltage is integrated and decreases in response to incident light.

During the integration stage, light energy in the form of photons strikes photodiode 26. Ideally each photon creates an electron-hole pair in the photodiode. Photodiode 26 is designed to limit recombination between the newly formed electron-hole pairs. As a result, the photogenerated holes and electrons migrate during the integration stage. The photogenerated holes are attracted to the ground terminal of the photodiode, and the photogenerated electrons are attracted to the positive terminal of the photodiode. Each additional electron attracted to the positive terminal of photodiode 22 reduces the voltage on the photodiode from the reset value R. The integration stage typically takes about 1 μsec.

During the signal readout stage, the resultant signal voltage S on photodiode 26 is sampled onto signal branch 38 and comparator branch 42. In a fully integrated pixel, corresponding to a brightest pixel in the image, the signal voltage S is about 1.5 volts.

During the reset stage, the value of the photodiode is reset to reset voltage R by sampling V.aa onto photodiode 26 using reset transistor 28. This reset value is sampled onto the reset branch 42. The reset operation typically takes about 1 μsec.

When column 34 is selected, the voltages S and R stored on holding capacitors 46 and 50, respectively, are transferred to difference amplifier 60. The sensed light level read out from the pixel, that is the number of photons incident on photodiode 26, is proportionate to the difference between the reset level R and the signal level S determined by difference amplifier 60.

When column 34 is selected, the signal voltage S stored on holding capacitor 54 is transferred to input node 62 of comparator 64 and compared to V.adj. Comparator 64 outputs a LOW value for S>V.adj and a HIGH value for S<V.adj which occurs at a light level 104.

Figure 3:
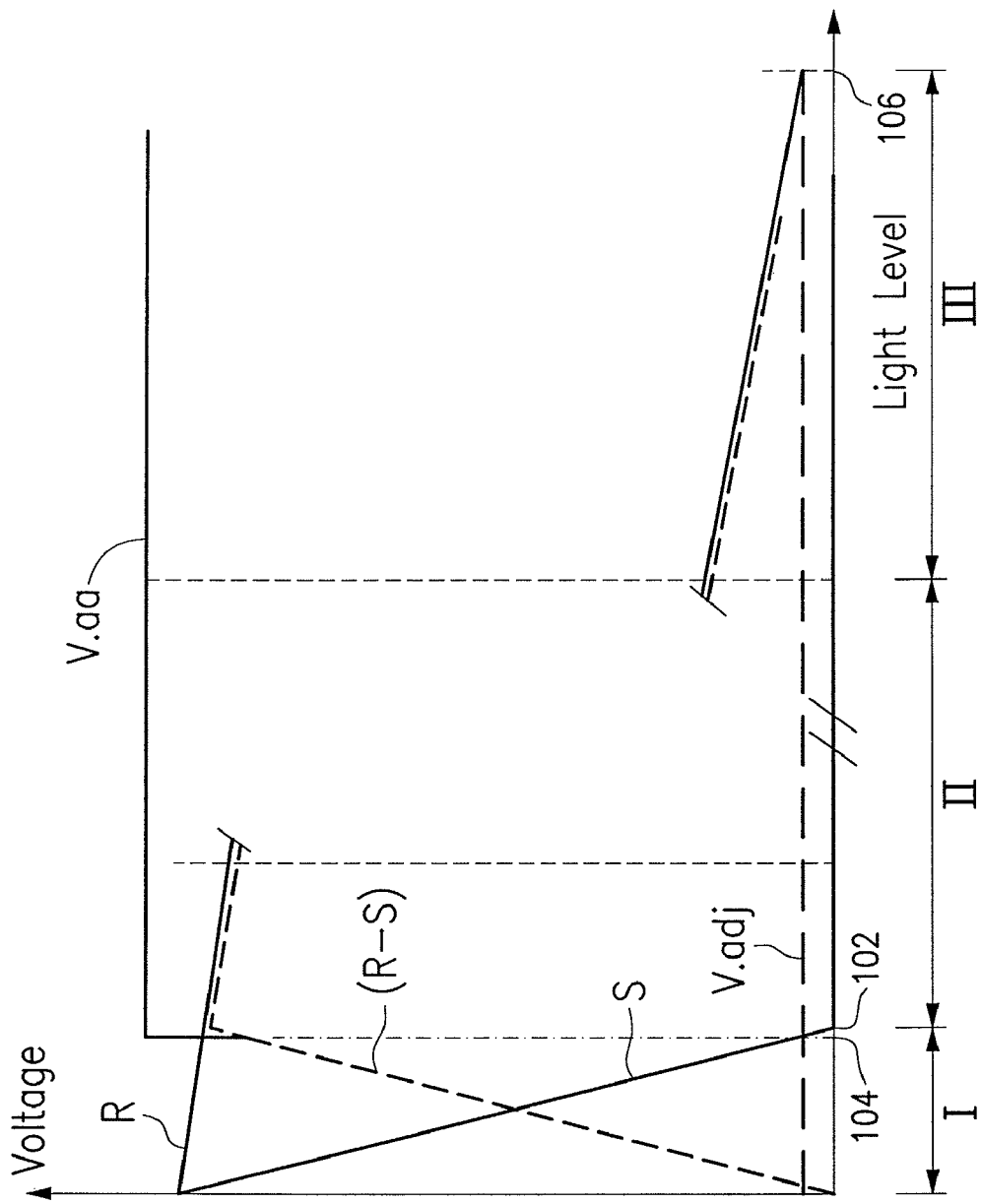
FIG. 3 is a chart showing the response of voltage levels to incident light levels according to the embodiment of FIG. 2.

FIG. 3 illustrates the response of signal voltage S, reset voltage R, and difference voltage (R-S) to an incident light level. At a sufficiently high incident light level, saturation light level 102, photodiode 26 becomes unable to absorb additional photons during the integration period and saturates. When this happens, signal voltage S drops to a saturation voltage V.sat, typically about 1.5 V, and remains constant at V.sat for all light levels above saturation light level 102.

As shown in FIG. 3, V.adj is set slightly above V.sat to ensure that comparator 64 will output a HIGH level when signal voltage S equals V.sat.

If signal voltage S is greater than V.adj, corresponding to an unsaturated pixel, comparator 64 outputs a LOW value and MUX 70 controls switch 74 at differential amplifier 60 to close, passing difference voltage (R-S) to the rest of the signal processing chain.

Signal voltage S will fall below V.adj for all light levels below an adjusted saturation light level 104 which is slightly below saturation level 102. Consequently at light level 104 the pixel is nearly saturated.

If signal voltage S is less than V.adj, corresponding to a (nearly) saturated pixel, comparator 64 outputs a HIGH value and MUX 70 controls switch 76 at voltage source 78 to close, passing V.aa to the rest of the signal processing chain. As shown in FIG. 3, V.aa is greater than difference voltage (R-S) for all light levels. Thus, the pixel is read as having a brightest value.

An APS according to the present embodiment prevents artifacts in the resultant image by replacing the value output from a saturated pixel with a maximum value, V.aa, for all light levels above an adjusted saturation light level 104 at which the pixel is nearly saturated.

Artifacts can be produced in conventional CMOS imagers because the reset voltage R, while ideally constant, in fact drops gradually in response to increasing light levels. This effect is due to pixel 22 still being exposed to light and hence producing electron-hole pairs during the reset stage. Since there is a finite time between setting the photodiode to the reset voltage R and sampling the reset voltage onto reset branch 40, electrons generated in the photodiode 26 by incident photons during the reset stage can migrate and reduce the voltage on the positive terminal of photodiode 26.

In Region I of FIG. 3, corresponding to the normal operating mode of the sensor, reset voltage R is relatively constant compared to S. However in Region II, reset voltage R gradually drops while signal voltage S remains constant at V.sat. Consequently, difference voltage (R-S) continues to drop with increasing light levels. In a conventional CMOS imager, the increasingly oversaturated pixel, which should appear to brighten in the image, actually reads out as a darkening pixel.

Figure 1:
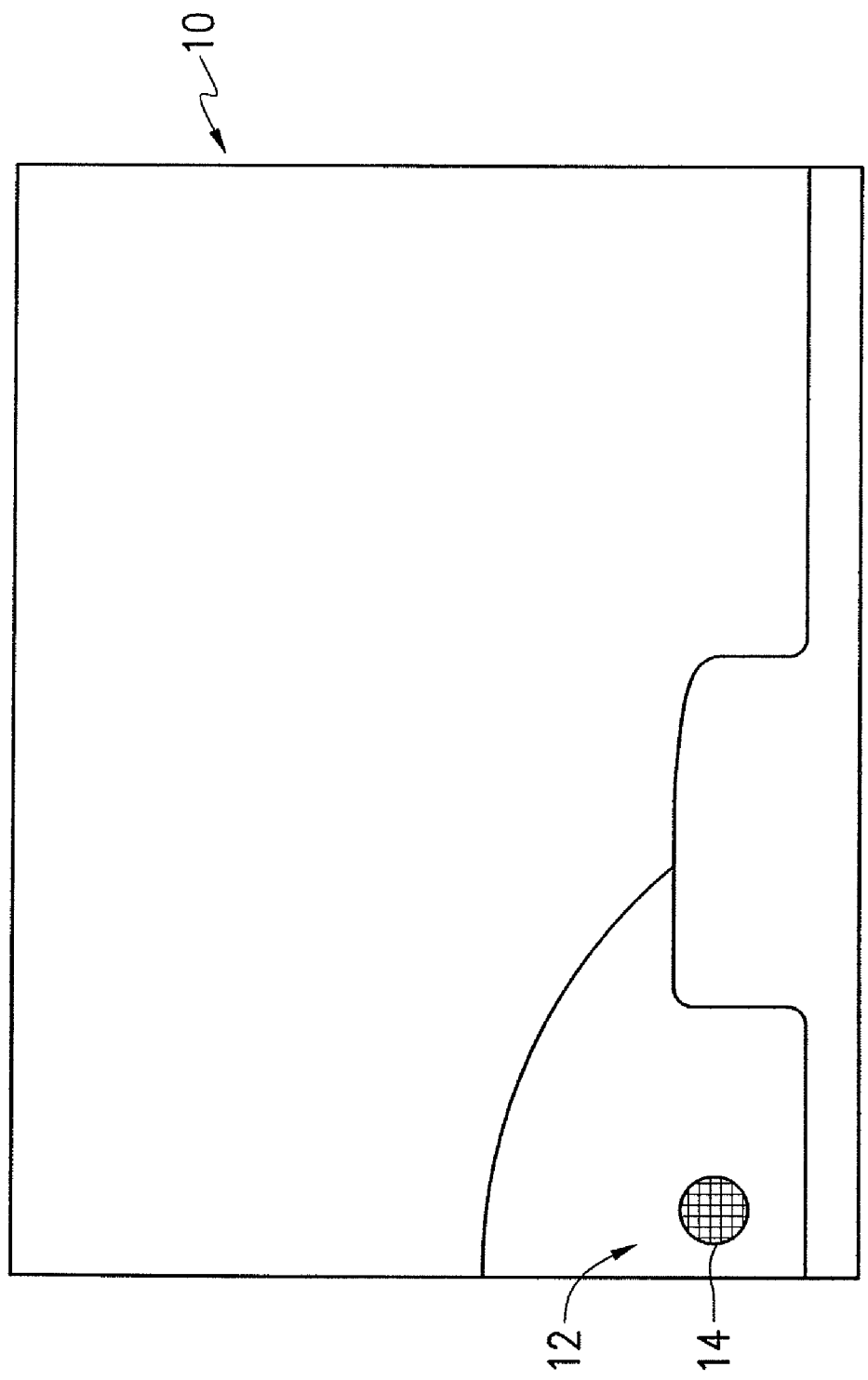
FIG. 1 is a digital image including an artifact produced in the center of the sun caused by oversaturated pixels.

As shown in Region III, at an extremely high light level 106, reset voltage R will also saturate at V.sat and difference voltage (R-S) will equal zero, representing a black pixel. Regions of such oversaturated pixels produce artifacts in conventional CMOS imagers. FIG. 1 illustrates such an artifact 14 in an image 10 produced with a conventional CMOS imager in which the center of the sun 12 appears black.

Since the output of pixel 22 is fixed at a maximum value V.aa for all light levels above that at which pixel 22 first saturates, the problem associated with reset voltage R approaching V.sat at extremely high light levels are eliminated. Consequently, no artifacts are produced in the resulting image.

Figure 4:
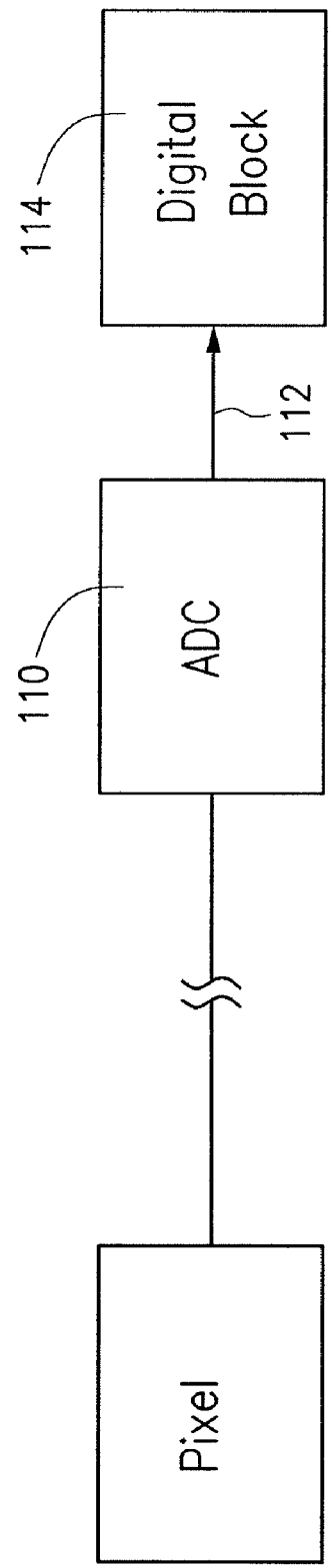
FIG. 4 is a schematic diagram of another embodiment including digital processing circuitry.

According to another embodiment, the APS CMOS device includes on-chip analog-to-digital conversion (ADC) circuitry 110, as shown in FIG. 4. The ADC circuitry is contained in a digital block 112. Analog signals read out from pixel 22 are converted to digital signals which are processed in the digital block 112.

The digital signals have a maximum value corresponding to the brightest level of the pixels in the image. For example, a maximum digital value for an 8-bit sensor would be 255 (corresponding to binary value "11111111"). Digital block 112 can be adapted to output the maximum digital value for analog voltage V.aa output by the sensor at all light levels above adjusted saturation level 104.

A number of embodiments of the invention have been described. Nevertheless, it will be understood that various modifications may be made without departing from the spirit and scope of the invention. For example, the photodetector shown in FIG. 2 as photodiode 26 could be any photo-sensing element such as a photogate or pinned photodiode. Accordingly, other embodiments are within the scope of the following claims.

What is claimed is:
1. An image sensor comprising:
    a photodetector for outputting an output level indicative of incident light;
    a sampling circuit that samples the output level and provides the output level from the photodetector if the output level exceeds an adjusted saturation voltage; and a saturation circuit that substitutes an adjusted maximum voltage for the output level when the adjusted saturation voltage exceeds the output level.

2. The image sensor of claim 1, further comprising a calculating circuit for calculating a difference voltage from the output level and a reset level.

3. The image sensor of claim 2, wherein the saturation circuit outputs the difference voltage when the output level exceeds the adjusted saturation voltage.

4. The image sensor of claim 1, further comprising an analog-to-digital converter electrically for converting the adjusted maximum voltage to a maximum digital value.

5. The image sensor of claim 1, wherein the adjusted saturation voltage is greater than a voltage at which the photodetector saturates.

6. An image sensor comprising:

a pixel comprising a photodetector for outputting a reset signal and a signal representing incident light;

a sampling circuit which samples said reset signal and signal representing incident light;

a combining circuit that combines said sampled reset signal and sampled signal representing incident light to provide a pixel output signal;

a detecting circuit for detecting if said signal representing incident light has a value less than that of a reference signal representing a saturation state of said pixel; and a circuit for substituting a signal representing a maximum output signal for said pixel for said output signal when said incident light signal has a value less than said reference signal.

7. The image sensor of claim 6, wherein said combining circuit subtracts said sampled reset signal and sample signal representing incident light.

8. The image sensor of claim 6, wherein said reference signal has a value near but above a value representing full saturation of said pixel.

9. The image sensor of claim 6, wherein said substituting circuit is an analog circuit.

10. The image sensor of claim 6, wherein the substituting circuit is a digital circuit.

* * * * *